United States Patent
Kawamura et al.

(10) Patent No.: US 7,782,795 B2
(45) Date of Patent: Aug. 24, 2010

(54) MULTICAST DATA COMMUNICATION SYSTEM, DATA COMMUNICATION APPARATUS, MULTICAST DATA COMMUNICATION METHOD AND COMPUTER READABLE NON-TRANSITORY INFORMATION RECORDING MEDIUM

(75) Inventors: Naokazu Kawamura, Kawasaki (JP); Yoriaki Shimada, Kawasaki (JP); Yoshiyuki Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 840 days.

(21) Appl. No.: 10/940,528

(22) Filed: Sep. 14, 2004

(65) Prior Publication Data

US 2005/0220074 A1    Oct. 6, 2005

(30) Foreign Application Priority Data

Mar. 30, 2004  (JP) .............................. 2004-101103

(51) Int. Cl.
 H04L 12/28   (2006.01)
(52) U.S. Cl. ..................................... 370/254; 370/390
(58) Field of Classification Search ......... 370/254–258, 370/351–463
 See application file for complete search history.

(56) References Cited

U.S. PATENT DOCUMENTS

| | | | |
|---|---|---|---|
| 5,758,083 A * | 5/1998 | Singh et al. ................. 370/254 |
| 5,949,761 A * | 9/1999 | Matsuno et al. ............. 370/254 |
| 6,215,766 B1 * | 4/2001 | Ammar et al. ............... 370/256 |
| 6,337,863 B1 * | 1/2002 | Nair et al. ............... 370/395.53 |
| 6,594,703 B1 * | 7/2003 | Li ................................ 370/245 |
| 6,654,371 B1 * | 11/2003 | Dunstan et al. ............. 370/390 |
| 6,658,481 B1 * | 12/2003 | Basso et al. .................. 370/351 |
| 6,717,919 B1 * | 4/2004 | Ketcham et al. ............ 370/255 |
| 7,031,654 B2 * | 4/2006 | Yamaguchi .................. 370/315 |
| 7,120,119 B2 * | 10/2006 | Frelechoux et al. ..... 370/395.52 |
| 7,133,922 B1 * | 11/2006 | She et al. ..................... 370/390 |
| 7,269,177 B2 * | 9/2007 | Baker .......................... 370/403 |
| 2004/0085961 A1 * | 5/2004 | Coffell et al. ............... 370/392 |
| 2005/0058085 A1 * | 3/2005 | Shapiro et al. .............. 370/256 |
| 2005/0129024 A1 * | 6/2005 | Fisher et al. ............. 370/395.1 |

FOREIGN PATENT DOCUMENTS

| | | |
|---|---|---|
| JP | 2000-83024 | 3/2000 |
| JP | 2001-144761 | 5/2001 |
| JP | 2001-244978 | 9/2001 |
| JP | 2003-032299 | 1/2003 |

OTHER PUBLICATIONS

"Japanese Office Action", English Translation, mailed Nov. 25, 2008 in corresponding Japanese Application No. 2004-101103.

* cited by examiner

Primary Examiner—Gregory B Sefcheck
Assistant Examiner—Joshua Smith
(74) Attorney, Agent, or Firm—Fujitsu Patent Center

(57) ABSTRACT

A management router is assigned for each of a division multicast domains obtained from dividing a multicast domain into predetermined divisions, and each of the management routers shares information concerning a location of a multicast information source belonging to the division multicast domain for which each of the management routers is assigned.

36 Claims, 11 Drawing Sheets

MULTICAST DATA COMMUNICATION SYSTEM, DATA COMMUNICATION APPARATUS, MULTICAST DATA COMMUNICATION METHOD AND COMPUTER READABLE NON-TRANSITORY INFORMATION RECORDING MEDIUM

BACKGROUND OF THE INVENTION

1. Field of the Invention

The present invention relates to a multicast data communication system, a data communication apparatus and a data communication method for the system, a program for causing a computer to carry out the method and a computer readable information recording medium storing therein the program.

2. Description of the Related Art

Recently, along with development of a highly-networked information society, optical fibers have been spread across the country, and, based thereon, IP networks have come to have higher data transfer rates and larger data transmission capacities. Thereby, data communication employing IP multicast communication technology has spread widely in such a form as that of services for delivering moving pictures, network game software, and so forth. As a typical example of IP multicast communication technology, a multicast method according to a protocol of a so-called PIM-SM (protocol independent multicast sparse mode), i.e., a PIM-SM BSR method is known. This method has been actually applied to many IP multicast networks.

According to the PIM-SM BSR method, a single BSR (bootstrap router) is allocated to an IP multicast domain for which IP multicast communication is carried out, for managing C-RP (rendezvous point candidate) information in the domain. In such a method, as a size of the IP multicast domain increases, a range of spread of an adverse influence tends to increase when a trouble occurs in the BSR. Furthermore, there may be a difficulty in terms of network operation, due to a difference in a management scope between the IP multicast domain and IP unicast domains included therein.

The PIM-SM BSR method is described next in detail. According to this method, from among C-BSRs (BSR candidates) existing in an IP multicast domain, one having the highest priority (when the priorities are equal, one having a largest IP address) is selected as a BSR. After that, to the BSR, each of L3-SWs or routers acting as C-RP (rendezvous point candidates) transmits its own C-RP information. After that, the BSR collects the received C-RP information, and carries out flooding therewith in a form of BSR messages in the IP multicast domain. As a result, each of the L3-SWs or the routers can recognize all the C-RP information in the IP multicast domain. Each of the L3-SWs or the routers then makes request for transmission and reception of multicast data based on the thus-recognized C-RP information, and thus, can carry out multicast data communication.

In this system, since only the single BSR is allowed to exit in the IP multicast domain, the single BSR should be in charge of the IP multicast domain even when the IP multicast domain includes a plurality of IP unicast domains.

With reference to figures, a procedure carried out until multicast communication is allowed to be actually carried out according to the PIM-SM BSR method is described next in sequence.

(1) Step 1: Operation Before a BSR is Selected

As shown in FIG. 1, each of L3-SWs (layer 3 switches) 111 through 119 acting as C-BSRs carries out flooding with a BSR message in an IP multicast domain, and thereby, they mutually compare priorities previously given thereto.

(2) Step 2: BSR Selection Operation

As a result, as shown in FIG. 2, the L3-SW 111 having the highest priority among the respective C-BSRs operates as a BSR in the IP multicast domain.

(3) Step 3: Notification of C-RP

As shown in FIG. 3, after that, each of the L3-SWs 112 through 119 other than the L3-SW 111 selected as the BSR as mentioned above carries out notification of C-RP information which the L3-SW has (MC group 'b', 'c', 'd', 'e', 'f', 'g' or 'h', shown) to the BSR 111. As a result, the BSR 111 can collect all the C-RP information (intra MC domain C-RP information) in the IP multicast domain. The C-RP information is information such as an IP address required to access to receive relevant information from a specific multicast information source therethrough.

(4) Step 4: Flooding with RP Information

The BSR 111 carries out flooding with all the C-RP information (intra MC domain C-RP information) in the IP multicast domain thus collected in Step 3, so as to notify of the information the respective L3-SWs 112 through 119, as shown in FIG. 4. Each of the L3-SW 112 through 119 receives this information, and thereby recognizes location information for RPs as a result of carrying out hash operation on the thus-received C-RP information (intra MC domain C-RP information). As a result, this system enters a state in which actual IP multicast communication is allowed to be carried out. In other words, in order to receive information from a specific multicast source, a receiving terminal can obtain location information for an RP through which the relevant information source is accessible, as a result of accessing any of the L3-SWs. After that, through the RP, the receiving terminal can receive the multicast information from the relevant information source.

SUMMARY OF THE INVENTION

However, when a case is assumed that the L3-SW 111 operating as the BSR has a trouble in the state in which multicast communication has been thus allowed to be carried out, it is necessary to transfer the position of BSR to another sound L3-SW. However, during operation of switching the position of the BSR for this purpose, all multicast communication in the IP multicast domain which the BSR originally manages is influenced. As a result, a situation in which multicast communication is not allowed to be carried out properly may occur. Furthermore, after the BSR once having a trouble revives therefrom and the BSR again starts normal operation as the BSR, all multicast communication in the IP multicast domain which the BSR originally manages is also influenced. As a result, a situation in which multicast communication is not allowed to be carried out properly may also occur.

In fact, in terms of operation of a communication network, network management operation is carried out for each of units of respective IP unicast domains D1, D2 and D2 (see FIGS. 1 through 4) included in the IP multicast domain. As a result, when a situation occurs in which the IP multicast communication is not allowed to be carried out as mentioned above, a considerable time may be required to carry out trouble separation in each of the unicast domains, and thus, there is a possibility that a serious problem occurs in terms of network operation management. Such BSR switching (change-over) operation carried out at a time of a trouble occurring in the BSR is described next.

(1) Step 1: Occurrence of BSR Trouble

As shown in FIG. 5, when a trouble occurs in the L3-SW 111 currently acting as the BSR, all multicast communication in the IP multicast domain managed by the BSR is influenced.

In this network, a scope which a network manager actually manages is each of the IP unicast domains D1, D2 and D3 included in the IP multicast domain, which is not coincident with the IP multicast domain itself. Thereby, a considerable time may be required to carry out separation of a trouble zone in which IP multicast communication is not actually available due to the trouble, i.e., processing to limit a range minimum to which the influence of the trouble spreads.

(2) Step 2: BSR Switching (Change-Over) Operation

As shown in FIG. 6, due to the trouble of the L3-SW 111 mentioned above, a BSR message which would be otherwise provided by the BSR is actually not provided to each of the other L3-SWs for a predetermined time interval. Then, this matter is detected, and thereby, each of the L3-SWs 112 through 119 starts processing of again selecting a BSR thereamong. The processing carried out at this time is same as that of Steps 1 and 2 described above with reference to FIGS. 1 and 2. As a result of the processing, the L3-SW 112 and the L3-SW 114 are selected as new BSRs, having the high priorities, and as a result, two BSR domains therefor are created accordingly. After that, Steps 3 and 4 described above with reference to FIGS. 3 and 4 is carried out. Thereby, IP multicast communication is allowed to be carried out in each of the two IP multicast domains.

As a method for solving such a problem occurring due to a trouble occurrence in a BSR, an IP multicast domain may be divided, and, then, the new BSR may be provided for each of the thus-divided IP multicast domains. By carrying out this method, it is possible to make a scope of network operation management of each BSR, same as or smaller than that of each particular IP unicast domain included in the original IP multicast domain. As a method of thus dividing the IP multicast domain, there is a method utilizing a so-called MSDP or DVMRP. However, there is not yet any IP multicast domain dividing method adequate to the PIM-SM BSR method which has been actually applied to many IP multicast communication systems as mentioned above. As a result, a considerable change in the IP multicast network would be required if the above-mentioned MSDP or DVMRP is applied to the IP multicast communication system according to the PIM-SM BSR method.

The present invention has been devised to solve the above-mentioned problem, and an object of the present invention is to provide a multicast data communication system, applicable of a PIM-SM BSR method, in which effective risk dispersion is achievable as a result of a multicast domain being divided.

According to the present invention, a multicast domain for which multicast communication is carried out is divided into predetermined divisions, a management router is assigned for each of division multicast domains obtained from the dividing, and, the respective management routers share information concerning locations of multicast information sources of the division multicast domains to which the management routers belong respectively.

In this configuration, even after the multicast domain is divided, location information for the multicast information sources in the division multicast domains is shared mutually among the management routers assigned to the respective division multicast domains. Thereby, each receiving terminal which wishes to obtain multicast information can utilize the multicast information source for this purpose throughout the scope of the original multicast domain existing before it has been divided.

Further, in the above-mentioned dividing of the multicast domain, it is preferable to divide the entire multicast domain in respective ones of unicast domains included therein, or to divide the same further finer. As a result, even if a trouble occurs in any of the management routers, it becomes possible to carry out trouble separation in a unit of the division multicast domain, which has the same scope of the relevant unicast domain or smaller than it, belonging to the management router. Thereby, it becomes possible to effectively reduce a range to which influence of the trouble spreads. In other words, as a result of information being shared among the management routers as mentioned above, each management router grasps the location information for the multicast information sources throughout the original multicast domain before it has been divided. As a result, even after the trouble occurs, each receiving terminal which wishes to obtain multicast information can utilize another management router which dose not have any trouble, and thereby, can continue multicast communication throughout the original multicast domain before it has been divided (however, excluding a scope which is temporarily removed by the above-mentioned trouble separation processing). That is, normally, a network manager is assigned for each of the unicast domains which configure the entire multicast domain, and it is expected that each network manager can relatively easily carry out trouble separation processing for the unicast domain of which the manager himself or herself is in charge. Therefore, operation responding to the trouble occurrence can be carried out thereby rapidly, and also, after the trouble separation, multicast communication can be continued for all the scope other than the separated scope.

This, according to the present invention, even applying the PIM-SM BSR method which has been widely applied as a method of multicast communication, it is possible to relatively easily establish a system which can minimize an influence from a possible trouble occurring in a BSR.

DETAILED DESCRIPTION OF THE PREFERRED EMBODIMENTS

Figure 1:
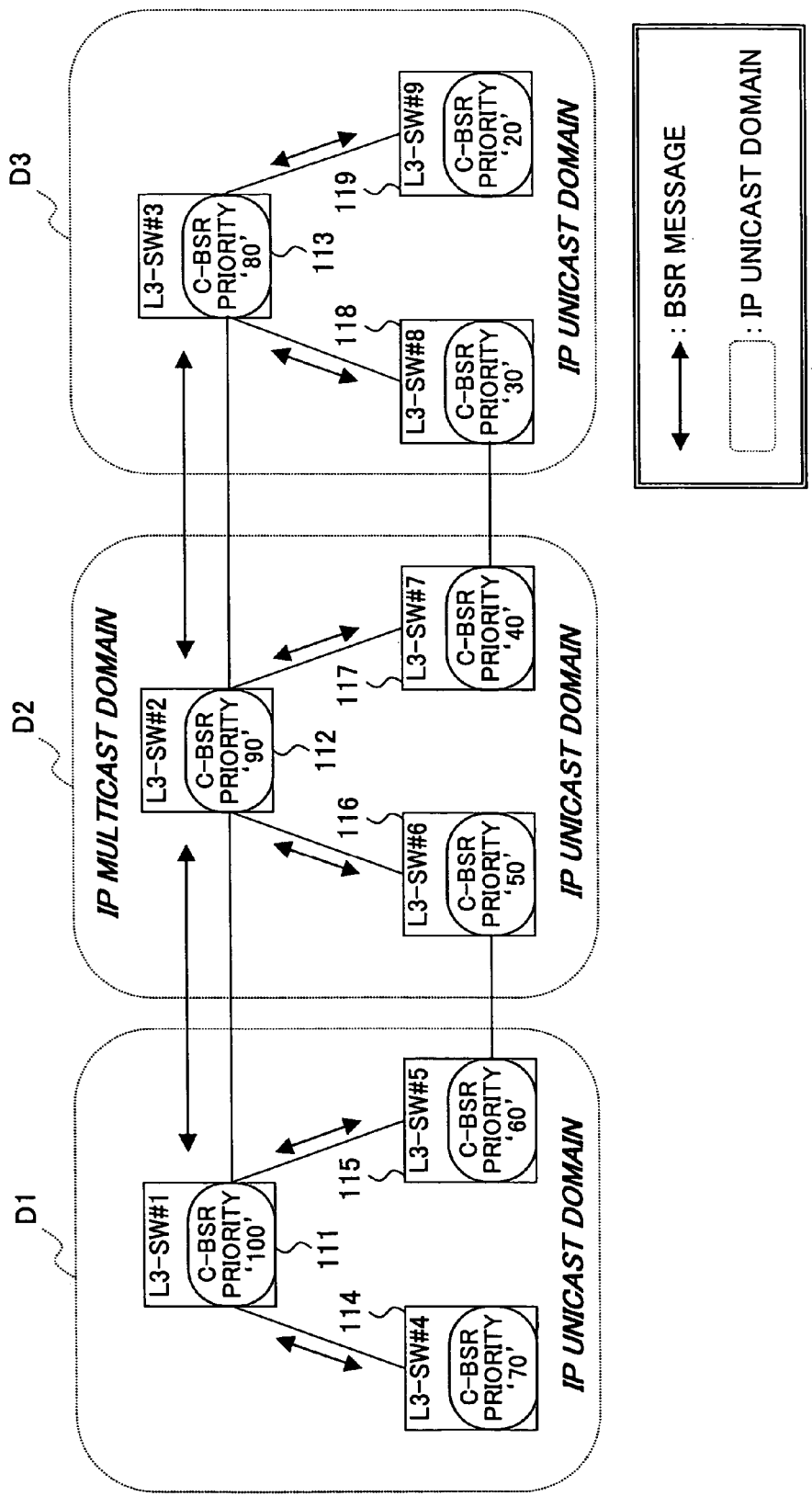
FIGS. 1 through 4 illustrate setting operation according to a PIM-SM BSR method.
Figure 2:
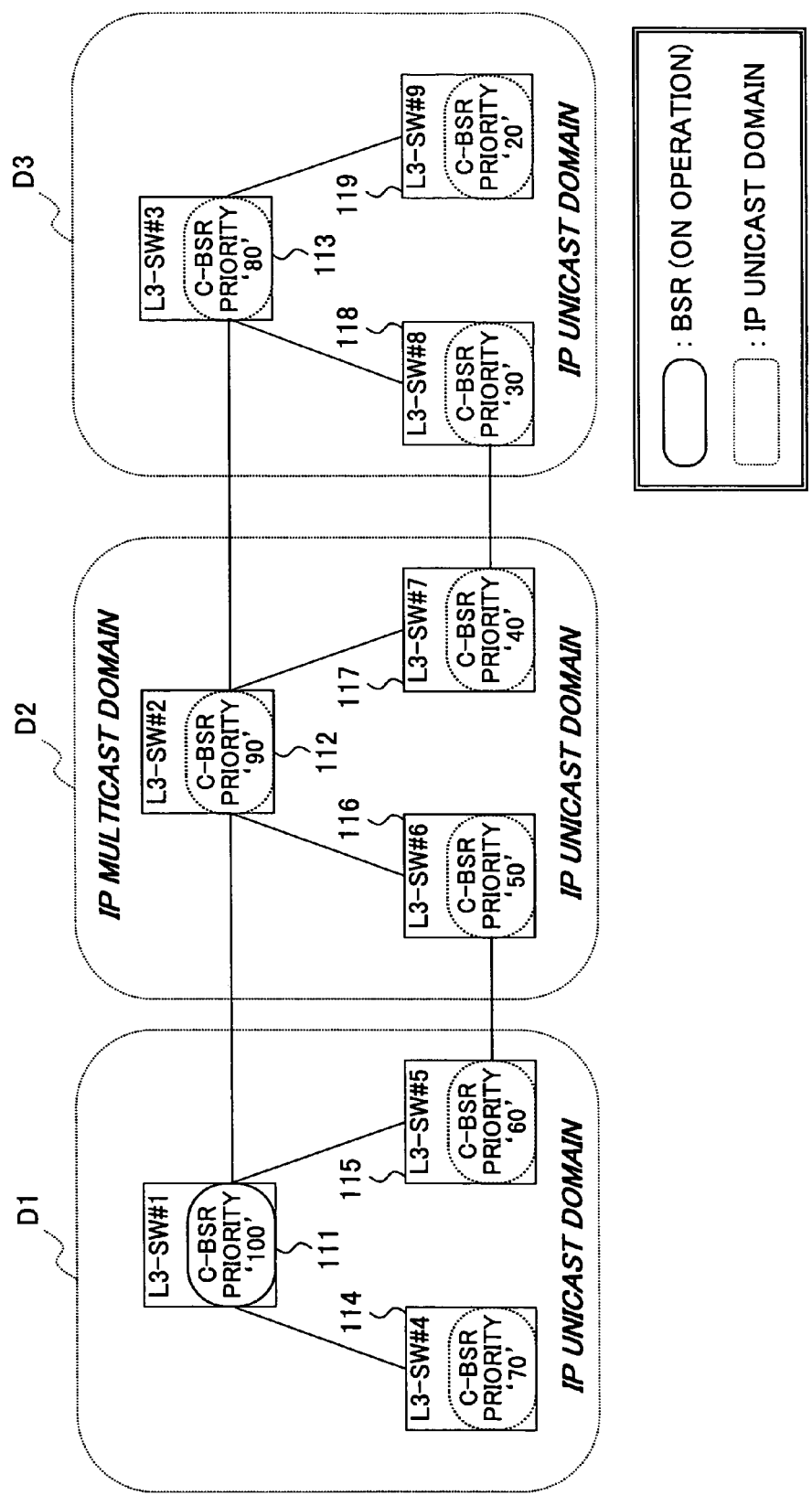
Figure 3:
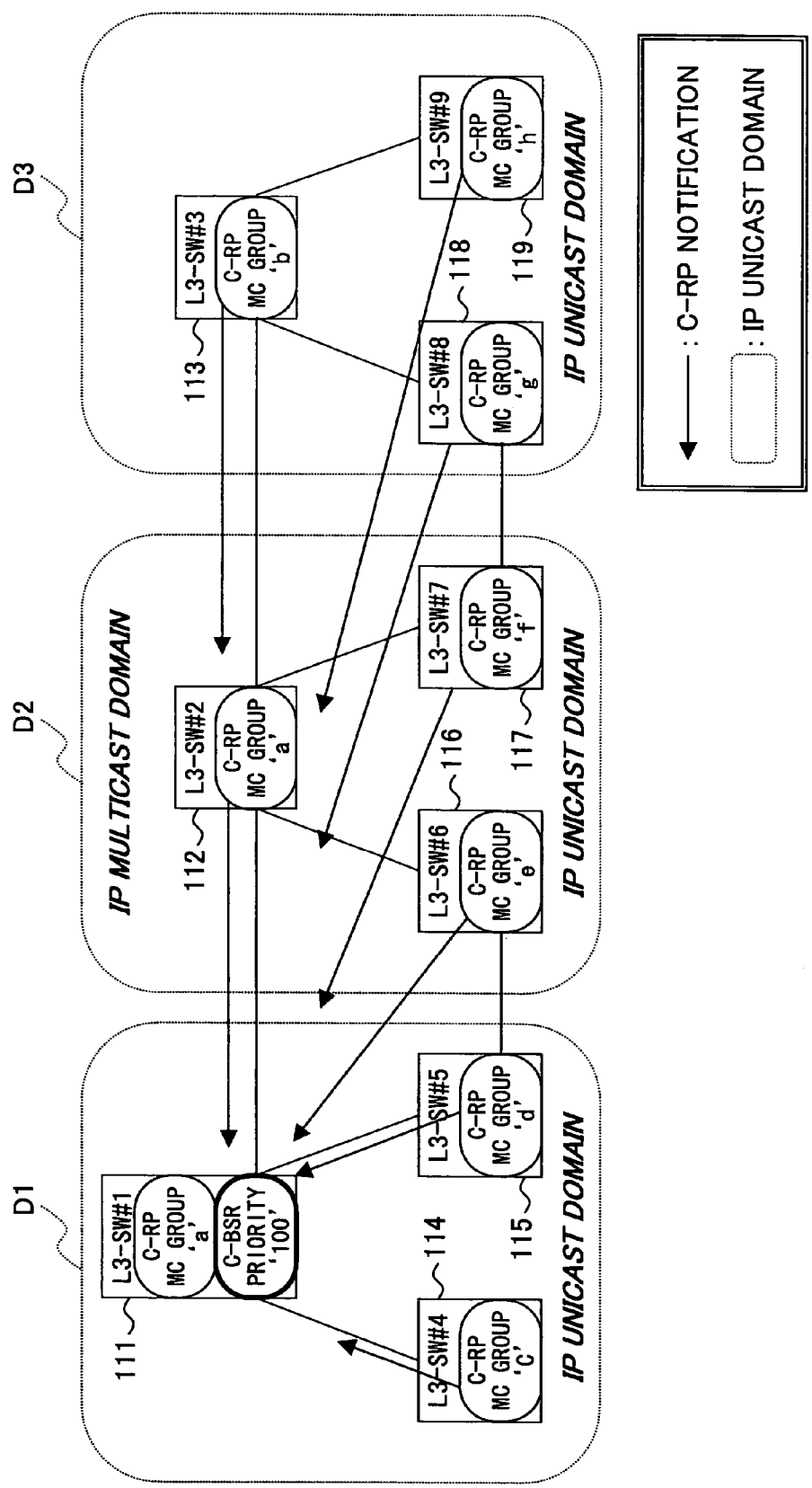
Figure 4:
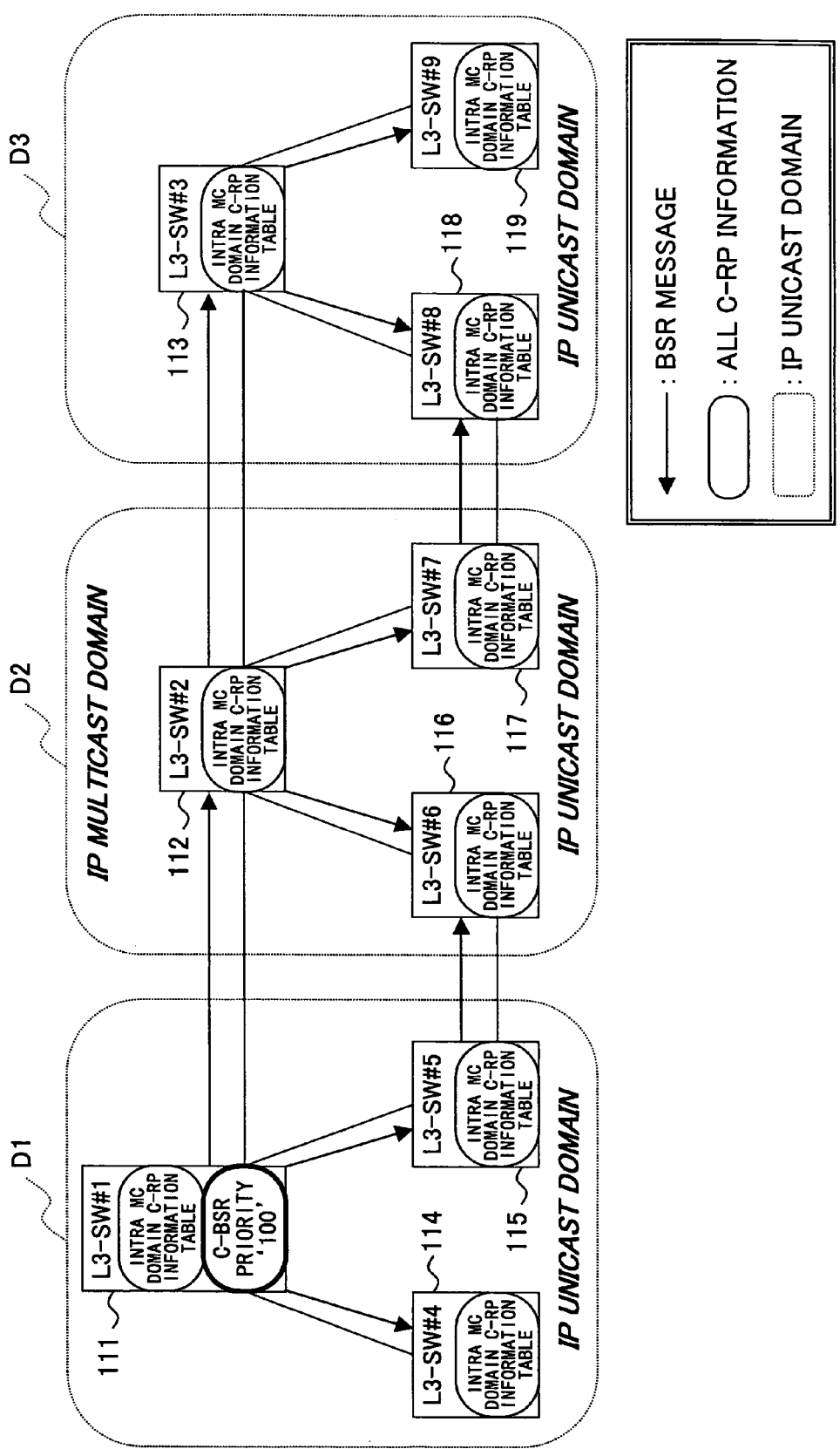
Figure 5:
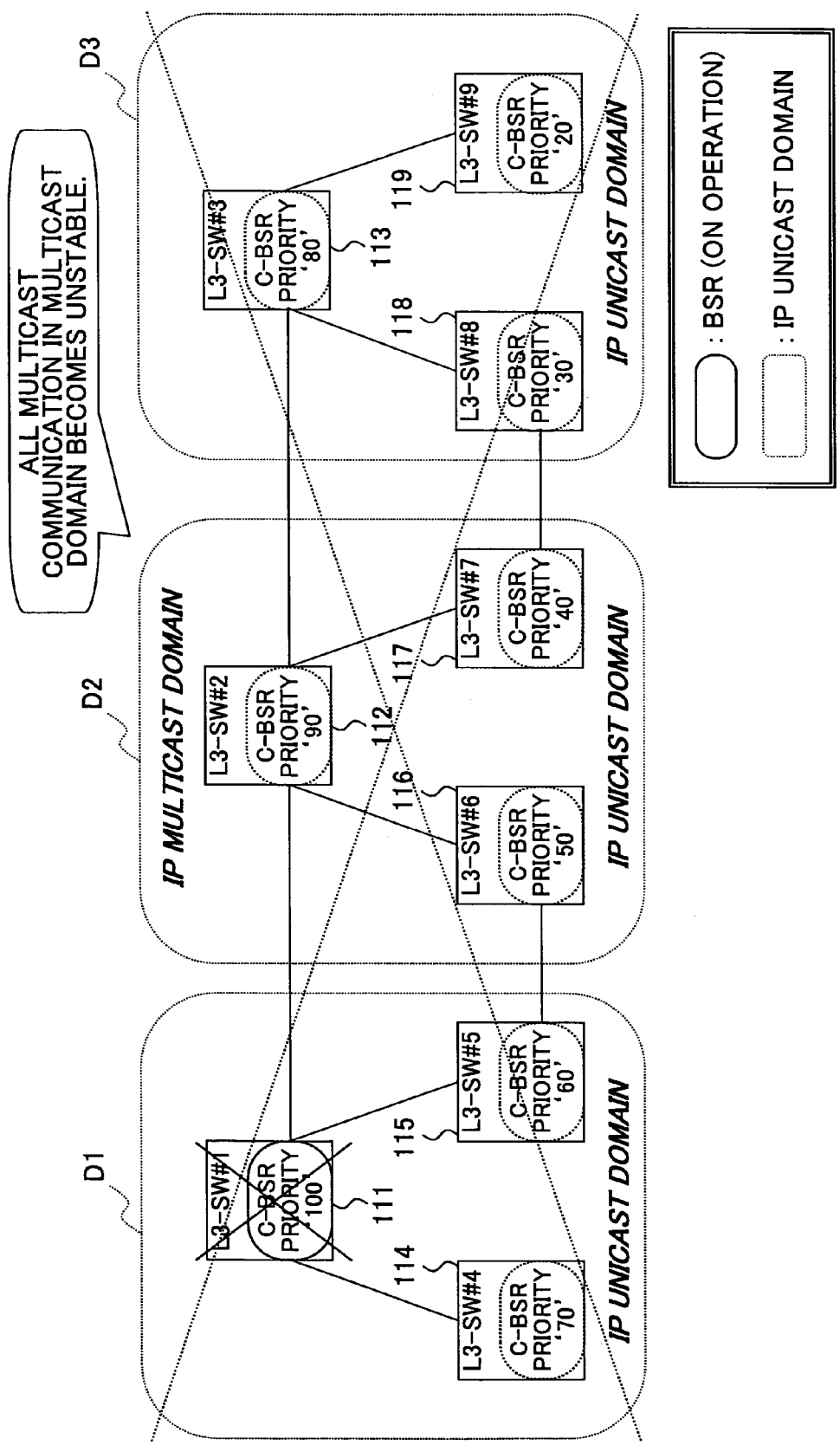
FIGS. 5 and 6 illustrate operation carried out when a trouble occurs in a BSR, according to a PIM-SM BSR method.
Figure 6:
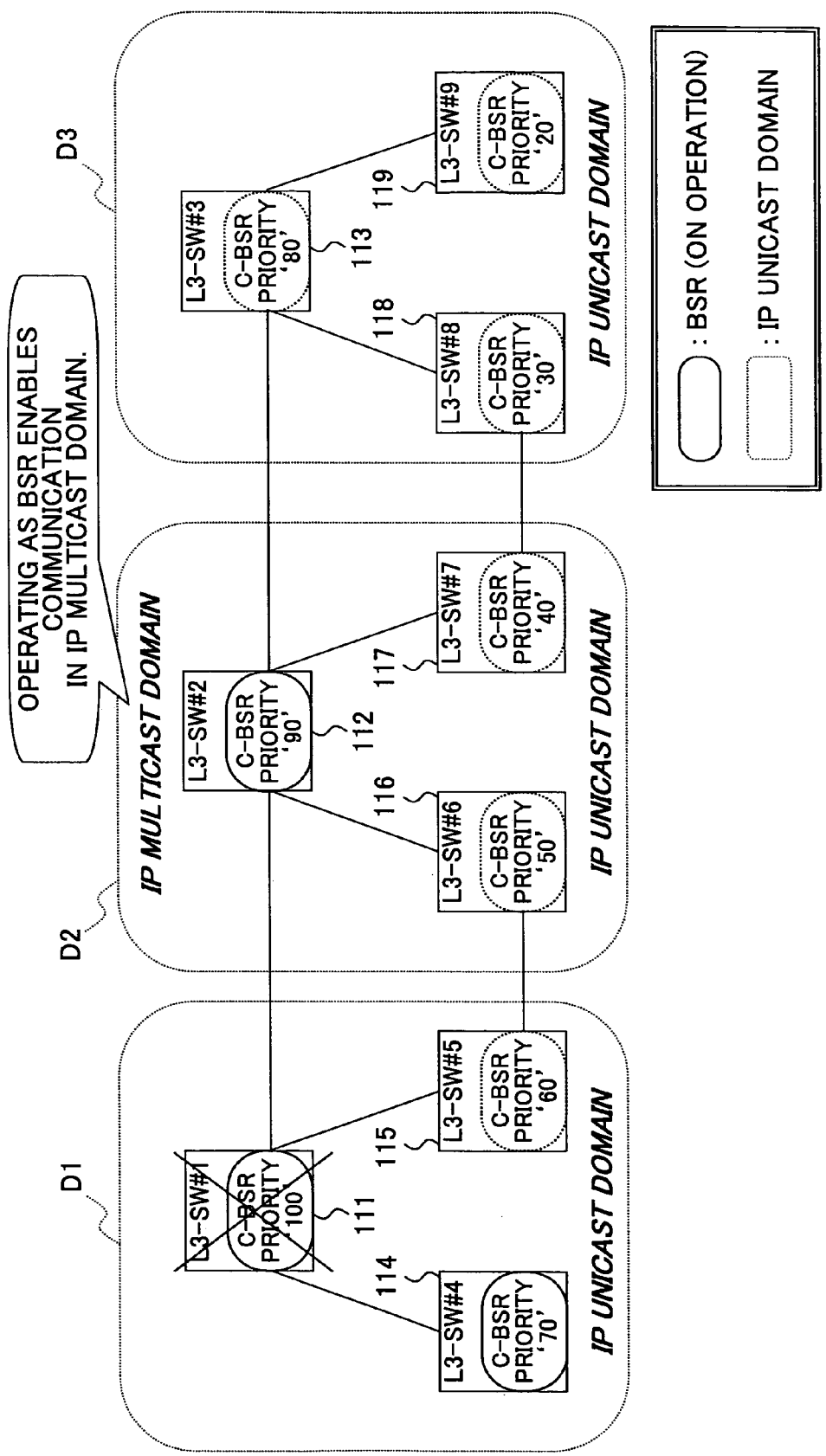

A multicast data communication system according to one embodiment of the present invention is described next with reference to figures.

According to the embodiment of the present invention, as a method for maintaining a multicast communication application scope before it is divided, after an IP multicast domain in a PIM-SM BSR method for an IP multicast network is divided, a function is provided for exchanging C-RP information among BSRs provided for respective ones of division multicast domains obtained as a result of the IP original multicast domain being divided as mentioned above.

In a PIM-SM IP multicast network employing a BSR (bootstrap router), conventionally, a single BSR should manage entire C-RP (rendezvous point candidate) information concerning the entire IP multicast domain in a lump-sum manner. Thereby, in a case where the IP multicast domain includes a plurality of IP unicast domains (in other words, a plurality of scopes each of which is directly managed by a particular network manger), these IP unicast domains do not coincide with the entire IP multicast domain. That is, even when the IP multicast domain thus includes the plurality of IP unicast domains, the single BSR should manage the entire C-RP information belonging thereto, and as a result, a problem may occur in terms of network operation management.

According to the embodiment of the present invention, in order to solve such a problem, a function of exchanging C-RP information among a plurality of BSRs (allocated for respective division IP multicast domains) is provided. Thereby, it becomes possible that the original multicast domain before it is divided is maintained even after the IP multicast domain is divided to the division IP multicast domains having the same scopes respectively as those of the respective IP unicast domains included in the original IP multicast domain.

Specifically, 'a BSR peer table part', described later, is provided in each BSR, and, there, a function is provided to set therein information concerning BSRs (referred to as peer BSRs, hereinafter) of the other division IP multicast domains. Further, 'a BSR state check part' is provided, BSR states in the other division IP multicast domains are checked therewith, and, from the information thus obtained, the states of the respective BSRs are registered and managed in the above-mentioned 'BSR peer table part'.

Further, an 'RP information delivery part' is provided by which C-RP information for the own division multicast domain is delivered to all the BSR peers in 'BSR operation' states managed in the above-mentioned 'BSR peer table part' in a form of an IP packet, and, delivery confirmation is carried out after that. Further, a 'C-RP information table' is provided in which, when the C-RP information is received from the 'RP information delivery part' of the BSR peer of the other division IP multicast domain, it is registered therein, and is further delivered to L3-SWs belonging to the BSR itself. The term 'BSR peers' means BSRs in charge of the respective division IP multicast domains The embodiment of the present invention having a configuration as described above is described next in further detail.

Figure 10:
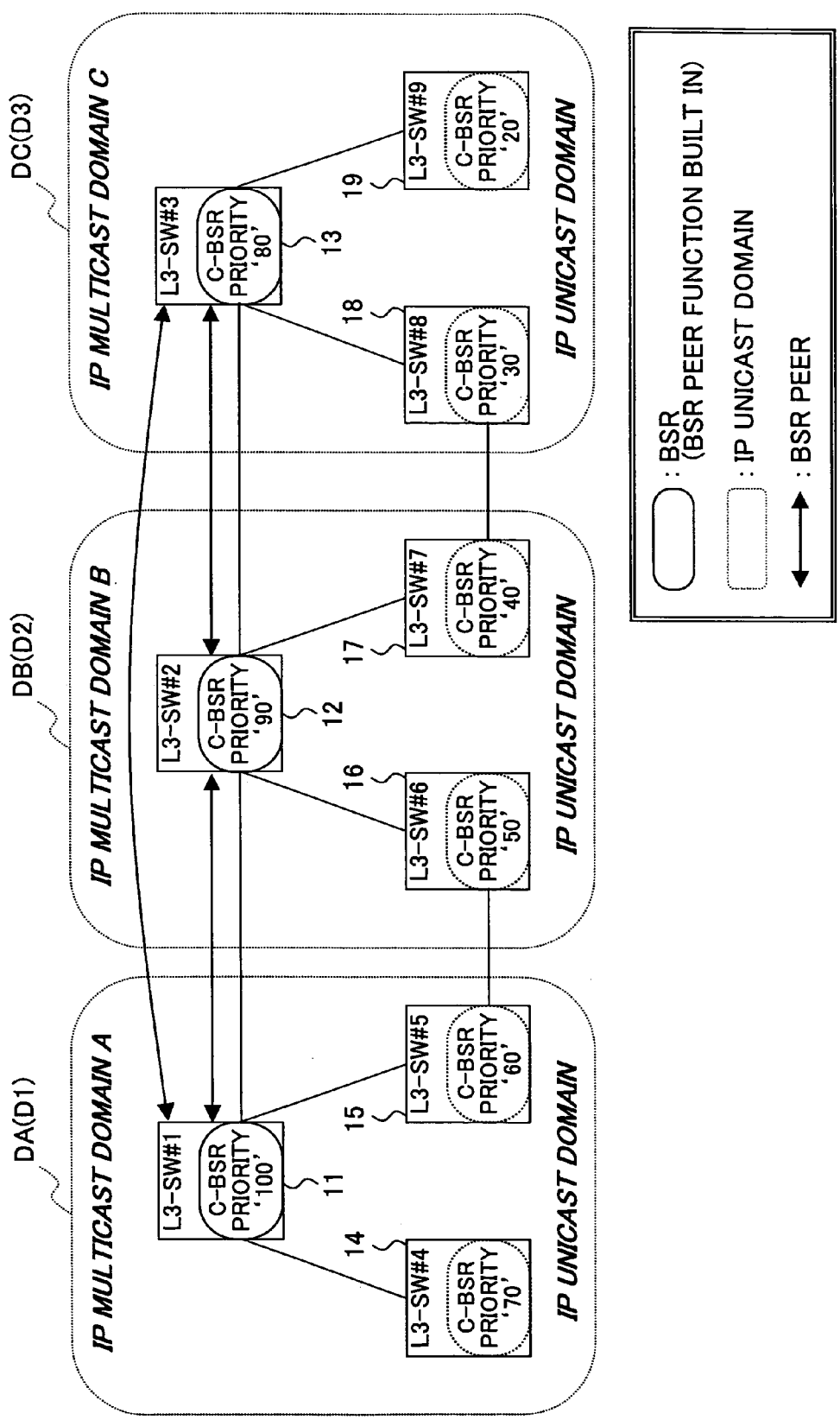
FIG. 10 is a system general configuration diagram illustrating a basic function of the embodiment of the present invention.

According to the embodiment of the present invention, as shown in FIG. 10, an IP multicast domain is divided into respective division multicast domains DA, DB and DC corresponding to and having the same scopes of IP unicast domains D1, D2 and D3 configuring the IP multicast domain, respectively. Then, for each of the division IP multicast domains, a BSR is allocated. In other words, for the division IP multicast domain DA, an L3-SW 11 is allocated as a BSR; for the division IP multicast domain DB, an L3-SW 12 is allocated as a BSR; and, for the division IP multicast domain DC, an L3-SW 13 is allocated as a BSR.

Figure 7:
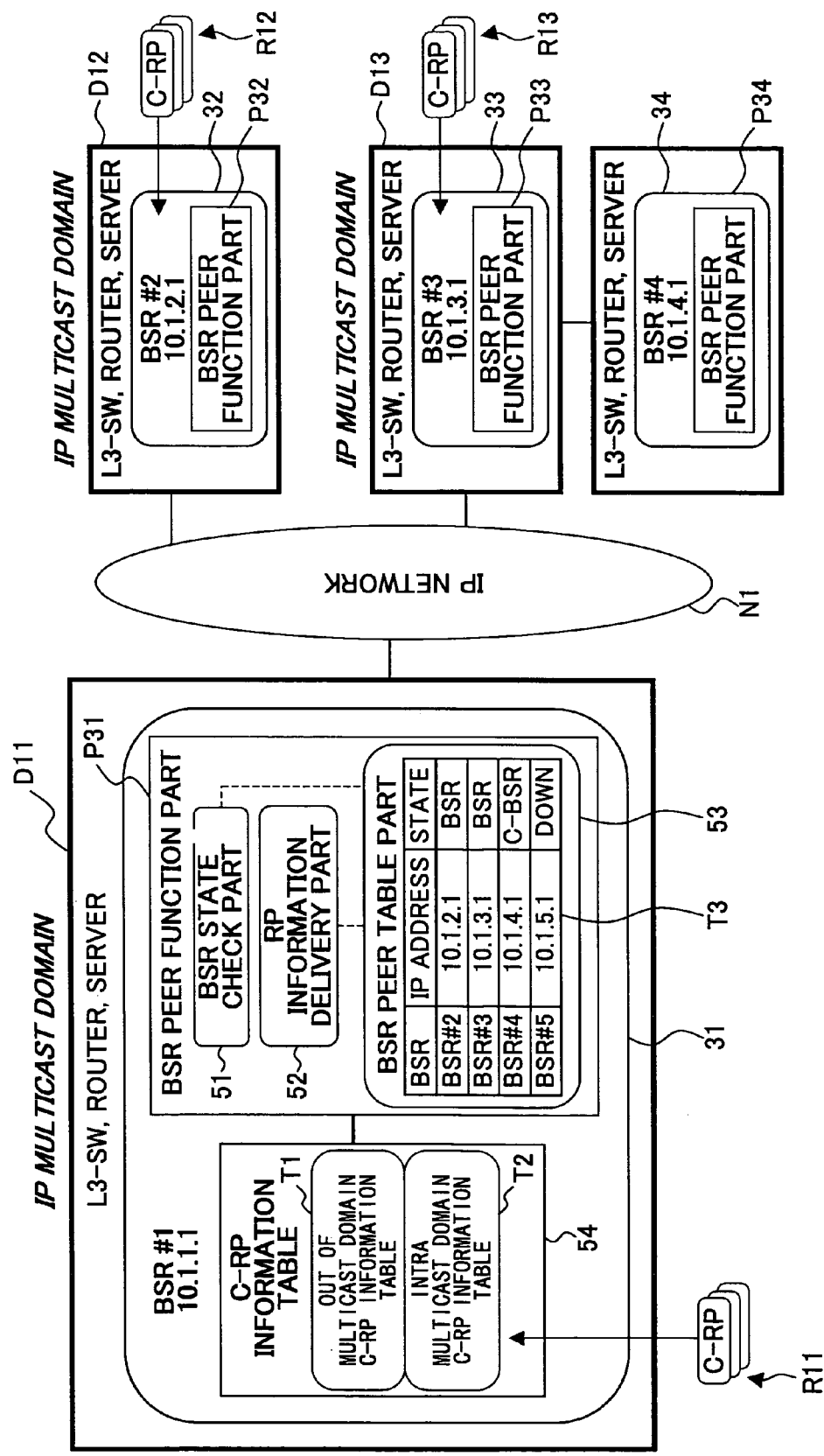
FIG. 7 shows a functional block diagram illustrating a basic function of one embodiment of the present invention.

FIG. 7 typically shows one BSR thereof in detail. For example, in the figure, IP multicast domains D11, D12 and D13 corresponding to the IP multicast domains DA, DB and DC shows in FIG. 10, respectively, an apparatus 31 corresponds to the L3-SW 11 shown in FIG. 10, an apparatus 32 corresponds to the L3-SW 12 shown in FIG. 10, an apparatus 33 corresponds to the L3-SW 13 shown in FIG. 10, and an apparatus 34 corresponds to an L3-SW 19 shown in FIG. 10. Furthermore, the configuration shown in FIG. 10 is basically same as the system described above in the Description of the Related Art, and, the L3-SWs 11 through 19 correspond to the L3-SW 111 through 119 shown in FIGS. 1 through 6. However, the L3-SWs 11 through 19 are different from the L3-SW 111 through 119 in that they have 'BSR peer functions' according to the embodiment of the present invention.

Returning to FIG. 7, from among L3-SWs, routers or servers belonging to each of the division IP multicast domains D11, D12 and D13, the data communication apparatuses 31, 32 and 33 are selected to act as the BSRs, and, therein, the above-mentioned BSR peer function parts P31, P32 and P33 are provided, respectively. Then, each of the respective apparatuses 31, 32 and 33 thus selected as the BSRs shares C-RP information which the other BSRs originally have (for example, RP information tables T1 and T2 which have information concerning C-RP R11 belonging to the relevant domain D11, shown in FIG. 7, and so forth), as a result of mutually delivering the information by means of inter BSR communication.

In other words, each BSR delivers the own C-RP information to the entire IP multicast domain which existed before it was divided. Then, each of the BSRs 31, 32 and 33 receives the C-RP information belonging to the other division IP multicast domains thus delivered, and manages the information in a form of the RP information table T1 together with the RP information table T2 belonging to the own division IP multicast domain. Then, each BSR further delivers the C-RP information to L3-SWs or routers belonging to the BSR itself so as to ensure that these L3-SWs or routers in the own division IP multicast domain grasp the information.

Thus, the respective BSRs 31, 32 and 33 of the division multicast domains are made to have these functions, and thereby, even when the division IP multicast domains D11, D12 and D13 are set to have the same scopes as those of the original IP unicast domains D1, D2 and D3, each receiving terminal which wishes to obtain multicast information can utilize the C-RP information of the entire IP multicast domain which existed before it was divided for this purpose as a result of accessing the predetermined L3-SW or such which is made to have the RP information concerning the entirety of the originally existing IP multicast domain, through the information delivery operation from the relevant BSR described above.

The functions each of the BSRs of the division IP multicast domains has are described next in further detail, one by one.

First, each of the BSR peer function parts P31, P32, P33 and P34 has a BSR peer table part 53, a BSR state check part 51 and a BSR information delivery part 52. Thereamong, the BSR peer table part 53 is a table for managing BSR identification numbers, IP addresses and operation states of the BSR peers, i.e., the BSRs 32, 33, 33 and so forth, as information concerning these BSR peers. In an example of FIG. 7, in a BSR peer table T3 which the BSR peer table part of the apparatus 31 manages, as shown, matters are registered that the apparatus 32 (BSR #2) and the apparatus 33 (BSR #3) are on operation as BSRs for these apparatuses, as well as the respective BSR identification numbers and IP addresses thereof. Furthermore, in the table T3, for the apparatus 34 (BSR #4), registration is made for a fact that it acts as a 'BSR candidate' (C-BSR), since the apparatus 34 belongs to the same division multicast domain D13 as that of the above-mentioned apparatus 33, where the apparatus 33 was selected as a qualified BSR as mentioned above. Furthermore, an apparatus (BSR #5) not shown is registered as being in a state of not on operation (DOWN) as a data communication apparatus, in the table T3.

The BSR state check part 51 has a function of periodically checking states of the BSRs managed in the above-mentioned BSR peer table T3. Since the checking processing is carried out with the use of normal IP packets, the L3-SWs or the routers which do not specially support this function carry out routing on the relevant IP packet in a same manner as that as if they handle a normal IP packet.

The RP information delivery part 52 has a function of delivering the C-RP information concerning the own division IP multicast domain (for example, D11) to the BSR peers outside of the own division IP multicast domain (i.e., to the BSR peers of the domains D12, D13 and so forth). In other words, by this function, from the apparatus 31, for example, the C-RP information is delivered to the apparatuses 32, 33 and 34. Further, the RP information delivery part 52 collects the C-RP information belonging to the other division IP multicast domains which are delivered in the same manner from the BSR peers (apparatuses 32, 33 and 34) existing outside of the division IP multicast domain D11 (i.e., from the BSR peers belonging to the domains D12 and D13), and, registers the collected information in the C-RP information management table 54 of its own. Also, the RP information delivery part 52 delivers the thus-obtained information then to the L3-SWs, routers or such which are C-RPs belonging to the own division IP multicast domain D11.

By this configuration, according to the embodiment of the present invention, the multicast data communication system according to the embodiment of the present invention enters a state in which the system can carry out predetermined normal functions, through operation described below.

FIG. 10 shows an example of a configuration of the system including L3-SWs or routers. In this example, all the C-BSRs have BSR peer functions described above to be carried out by the BSR peer function parts. In this case, the IP multicast domain is divided as mentioned above. Then, in order to enable multicast communication throughout the entire original IP multicast domain in a situation in which each particular division IP multicast domain obtained from the above-mentioned dividing operation has the same scope as that of the corresponding particular IP unicast domain, the above-described BSR peer function is mounted in each of the data communication apparatuses 11 through 19 acting as the BSR candidates (C-BSRs) in a form of L3-SWs, for example.

In this case, the BSR peer function, i.e., the functions of the BSR peer function parts P31, P32, P33 and P34, and the function of the C-RP information table 54 can be achieved as a result of a program including instructions for causing a computer to execute these functions being produced, and the a computer controlling a relevant data communication apparatus such as an L3-SW, a router, a server or such, being made to execute the program.

Operation of this system is roughly described next. In order to achieve a system of division IP multicast domains having same scopes of those of respective IP unicast domains, respectively, included in the original IP multicast domain before it is divided, after dividing the original IP multicast domain, the plurality of BSRs (having the above-mentioned BSR peer functions built therein, respectively) are set in units of the respective IP unicast domains D1, D2 and D3. Then, the respective BSRs carry out setting (i.e., registration management of the BSR peer tables T3) among the respective division IP multicast domains DA, DB and DC such that the respective BSRs may recognize the BSR peers mutually. Thereby, the respective BSR peers deliver and collect the C-RP information which they originally have, respectively, and thus, the above-mentioned BSR peer function is achieved.

Each BSR peer registers, in the C-RP information table 54 in the own apparatus, the C-RP information concerning the other division IP multicast domains collected by means of the above-mentioned BSR peer function and the C-RP information received from the data communication apparatuses acting as the C-RPs belonging to the own division IP multicast domain, and also, delivers the thus-obtained information to the other L3-SWs or routers belonging to the own division IP multicast domain in change of by itself.

Specifically, in the example shown in FIG. 10, among the L3-SWs 11 through 19 belonging to the respective division IP multicast domains DA, DB and DC, respectively, first, by means of the function of the BSR state check part 51, the states of the BSRs are notified of, therebetween. Thereby, the BSRs are set (selected) for the respective ones of the division IP multicast domains DA, DB and DC. Specifically, as described above in the Description of the Related Art, priorities previously determined for the respective apparatuses are compared with each other, and the apparatuses 11, 12 and 13, having the highest priorities in the respective ones of the division IP multicast domains DA, DB and DC, are selected as the BSRs of the respective ones of the division IP multicast domains DA, DB and DC. Then, the selection result is registered. The other data communication apparatuses are registered as respective BSR candidates (C-BSRs) on the other hand (see FIG. 7, the table T3).

Then, the BSRs 11, 12 and 13 of the respective division IP multicast domains collect the C-RP information for the division IP multicast domain in charge of by itself. After that, among the BSR peers 11, 12 and 13, the C-RP information which they have respectively is then exchanged mutually. As a result, each of the BSRs 11, 12 and 13 comes to have the C-RP information not only for the own division IP multicast domain but also for the other division IP multicast domains.

As a result, even after the IP multicast domain for which IP multicast communication is carried out is divided into the division IP multicast domains DA, DB and DC having the scopes same as those of the particular IP unicast domains included in the original IP multicast domain, IP multicast communication throughout these division IP multicast domains can be carried out. In other words, as described above in the Description of the Related Art, it is possible to ensure, for all the division IP multicast domains, the same functions as those obtained when IP multicast communication was operated for the original IP multicast domain containing all the IP unicast domains can be obtained.

These BSR peer function operations are described next in more details with reference to flow charts of FIGS. 8 and 9.

Figure 8:
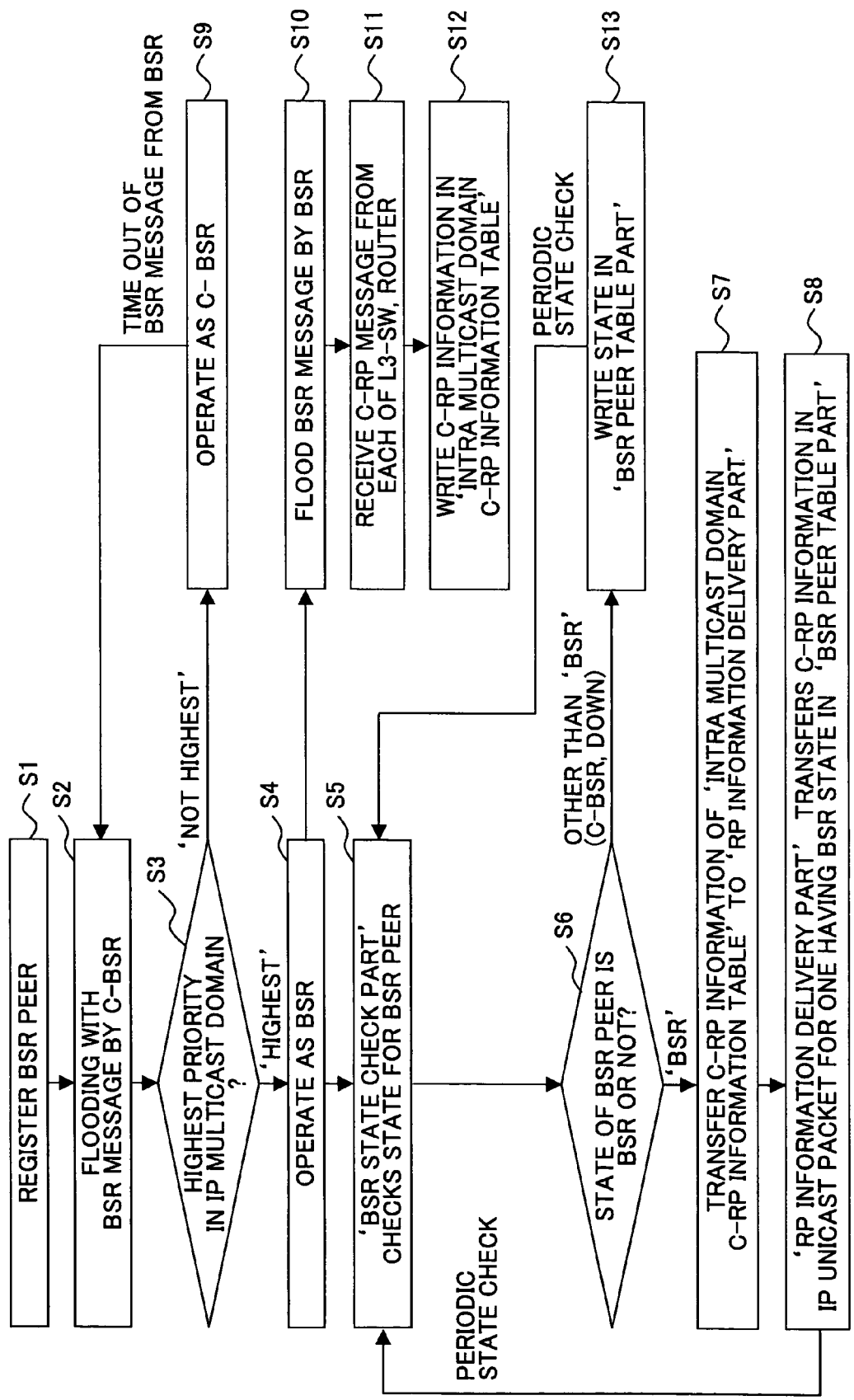
FIG. 8 is an operation flow chart of C-RP information delivery operation according to the embodiment of the present invention.

FIG. 8 shows the flow chart of C-RP information delivery operation carried out by the L3-SW, router or server (the data communication apparatus 31 in FIG. 7, for example) having the above-described 'BSR peer function' (i.e., the functions of the above-mentioned BSR peer function part P31 and the C-RP table 54) built therein.

In Step S1 in FIG. 8, operation for registering the BSR peers, i.e., the apparatuses acting as the BSRs in respective ones of the division IP multicast domains created as a result of the original IP multicast domain being divided is started. Specifically, in Step S2, among the apparatuses previously registered as the C-BSRs (L3-SWs, routers, or servers), flooding with a BSR message is carried out in the own division IP multicast domain. Then, in Step S3, each of them determines whether or not it has the highest priority thereamong. As a result, when it determines that it has the highest priority, Step S4 is carried out, and after that, it acts as a BSR.

On the other hand, when it is not one having the highest priority, it carries out Step S9. In Step S9, it then acts as a C-BSR. However, in this case, the C-BSR monitors a BSR message from the BSR, and, when it receives no BSR message from the BSR for a predetermined time interval, it determines that the BSR has a trouble. Then, the C-BSR returns to Step S2, and carries out flooding with a BSR message again for the purpose of selecting a new BSR instead.

After Step S4, the apparatus acting as the BSR caries out flooding with a BSR message in Step S10, so as to receive C-RP messages from other data communication apparatuses (L3-SWs, routers or such) acting as C-RPs in the same division IP multicast domain. Then, the BSR records the thus-received C-RP information in the intra multicast C-RP information table T2 of the C-RP information table 54 shown in FIG. 7, in Step S12.

Further, by means of the function of the BSR state check part 51 of its own, the apparatus acting as the BSR makes inquiry to check BSR states for the BSR peers, i.e., the BSRs in charge of the other division IP multicast domains belonging to the original IP multicast domain for which multicast communication is carried out, in sequence.

Then, in Step S6, the BSR determines whether or not each of the BSR peers is in a BSR operation state. When one of these BSR peers is not in a normal BSR operation state, Step S13 is carried out. In Step S13, the state thus obtained is reflected in the BSR peer table T3, and after that, Step S5 is carried out. In Step S5, the BSR peer state check operation (i.e., operation of checking states of the BSRs in charge of the other division IP multicast domains) is periodically repeated. A time interval of the repetition is 30 seconds, for example.

When it is determined that the BSR peer is in a normal operation state as BSR as a result of Step S6, Step S7 is carried out. In Step S7, the BSR transfers 'intra multicast C-RP information table', i.e., C-RP information of the division IP multicast domain in charge of by itself, or the information collected in Steps S10 through S12 from the own division IP multicast domain, to the RP information delivery part 52. Then, in Step S8, the RP information delivery part 52 transfers the C-RP information of the own division IP multicast domain transferred thereto in Step S7, to the BSR peers having the states registered as 'BSRs', i.e., the BSR peers which have been determined as being 'on operation as BSR' (normal states) in Step S6, in a form of IP unicast packets. After that, the BSR carries out Step S5, and then repeats the above-mentioned operation in the same manner so as to check the BSR peer states and transmit the C-RP information thereto, periodically.

Figure 9:
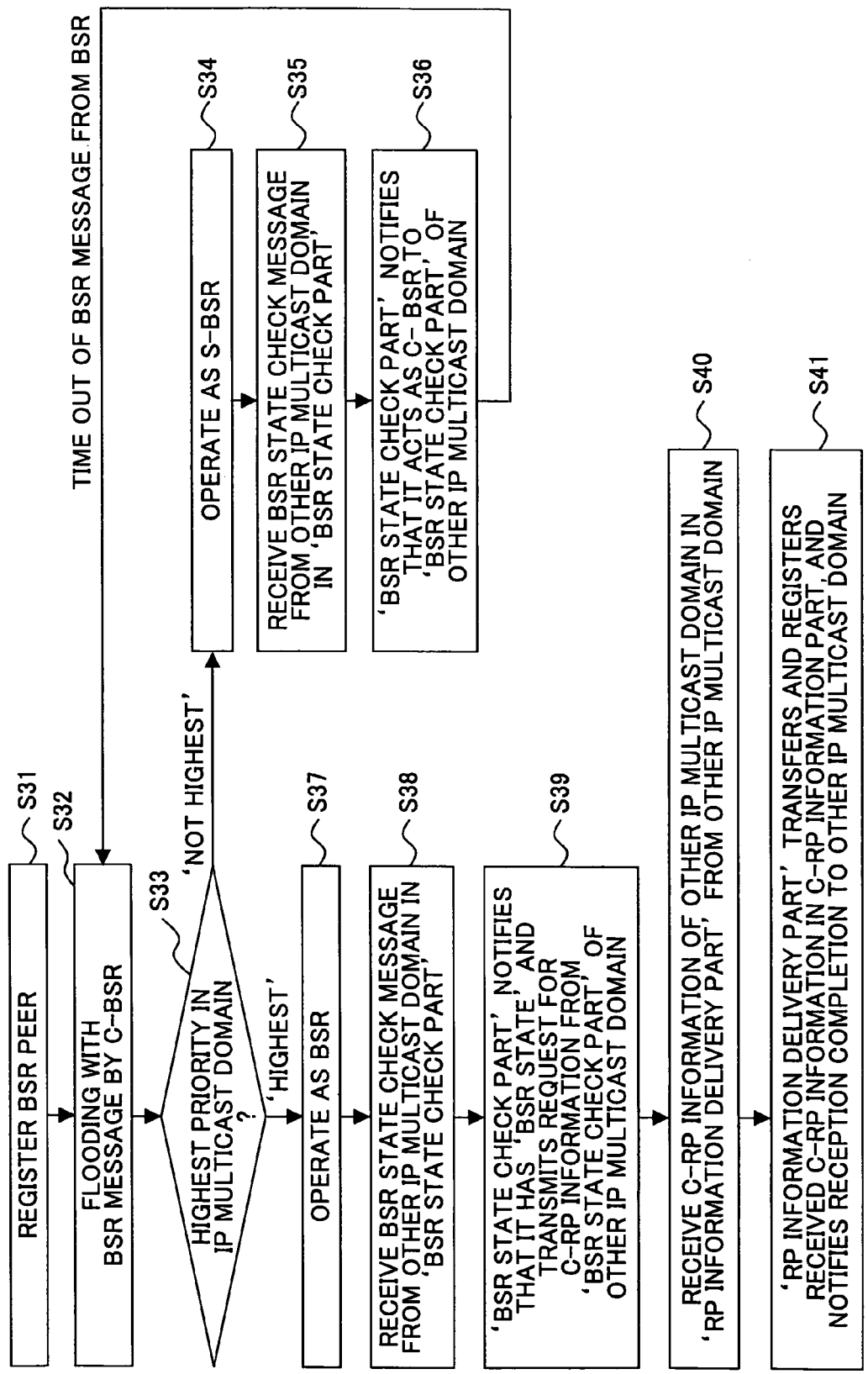
FIG. 9 is an operation flow chart of C-RP information reception operation according to the embodiment of the present invention.

FIG. 9 shows a flow chart of C-RP information receiving operation carried out by the L3-SW, router or server (data communication apparatus) having the BSR function built therein. In the figure, operations in Steps S31 through S33, S34 and S37 are same as those of Steps S1 through S3, S9 and S4, and the duplicated description thereof is omitted.

In Step S35, while the apparatus acts as a C-BSR, when receiving a message of inquiry (a message transmitted in Step S5 of FIG. 8) for a BSR state for the BSR state check part 51 of the own apparatus from the BSR peer of the other division IP multicast domain, the apparatus acting as the C-BSR carries out Step S36. In Step S36, this apparatus responds thereto to notify that it acts as a C-BSR to the BSR peer. The BSR peer in the other division IP multicast domain which receives this message carries out Step S13 after carrying out Step S6 to reflect the received information in its own BSR peer table part. After that, when a predetermined time interval has elapsed without receiving a BSR state check message in Step S35 from the BSR in the same division IP multicast domain, this C-BSR returns to Step S32, and then, carries out flooding with a BSR message again, the same as in Step 2 in the flow of FIG. 8 for the purpose of selecting a new BSR as mentioned above.

On the other hand, while the apparatus acts as a BSR, in Step S38, the same as in Step S35 described above, when receiving a message of inquiry (a message transmitted in Step S5 of FIG. 8) for a BSR state for the BSR state check part 51 of the own apparatus from the BSR peer of the other division IP multicast domain, the apparatus acting as the BSR carries out Step S39. In Step S39, the apparatus responds thereto to notify that it acts as a BSR in this case. The BSR peer which receives this message carries out Step S7 after carrying out Step S6 for transferring the C-RP information of its own division IP multicast domain to the BSR peer as described above. On the other hand, in Step S39, the BSR transmits a message to request the C-RP information from the BSR peer in the other division IP multicast domain.

The BSR peer in the other division IP multicast domain which receives this message carries out Steps 7 and 8, and then, transmits the C-RP information of the own division IP multicast domain. The BSR which receives the C-RP information from the BSR peer receives it in the RP information delivery part 52 of its own (Step S40 in FIG. 9). Then, the BSR carries out Step S41 to transfer the contents (the C-RP information of the other division IP multicast domain) thus received to the C-RP information table 54 in the own apparatus, and registers them in the 'out of multicast C-RP information table'. Then, the BSR returns a reception completion message to the BSR peer.

Through the operations described above with reference to FIGS. 8 and 9, the BSRs in charge of the respective division IP multicast domains mutually exchange the C-RP information periodically while checking the states of the BSR peers in charge of the other division IP multicast domains mutually. Thereby, the IP multicast communication functions according to the PIM-SM BSR method including data delivery through the different division IP multicast domains is always ensured properly.

Figure 11:
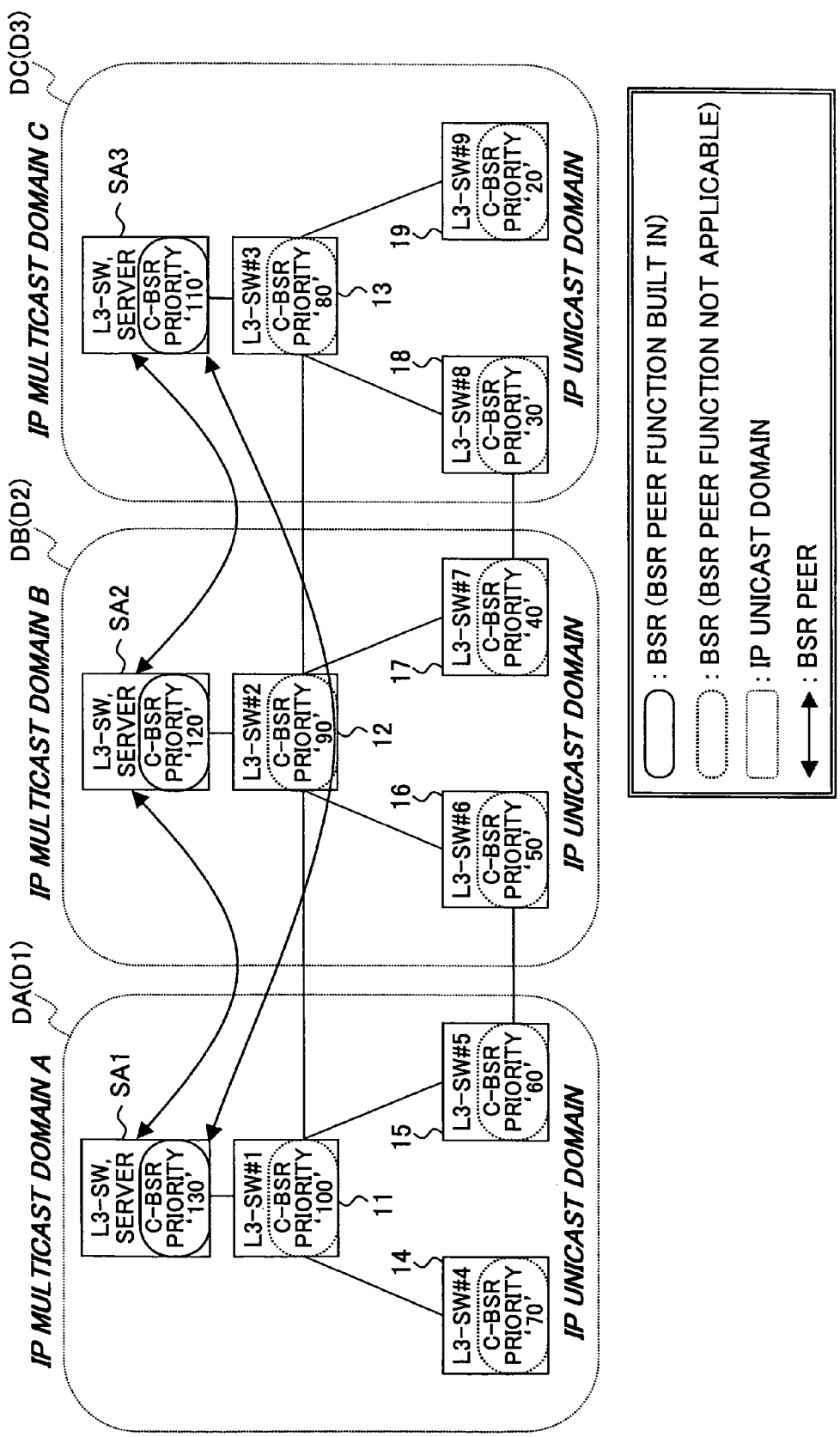
FIG. 11 is a system general configuration diagram illustrating a basic function of another embodiment of the present invention.

FIG. 11 shows a block diagram of a multicast data communication system according to another embodiment of the present invention. In this example, the system is configured by L3-SWs, routers or servers the same as in the above-mentioned system. However, only some of C-BSRs have the BSR peer function mounted therein. In other words, in this example, all data communication apparatuses acting as C-BSRs included in the communication network should not necessarily have the above-mentioned BSR peer functions. The same as in the above-mentioned embodiment, an IP multicast domain is divided, and particular IP multicast domains obtained from the dividing operation have the same scopes as those of the particular IP unicast domains, respectively. After that, a system is build therefrom in which IP multicast communication through the entire original IP multicast domain is available. In this embodiment, an L3-SW, a router or a server, having the above-mentioned BSR peer function mounted therein is set in each of the division IP multicast domains DA, DB and DC. Operation in this system is roughly described next.

In order to build the system of the division IP multicast domains having the same scopes of those of the original IP unicast domains, a plurality of data communication apparatuses (in each of which the BSR function is not applicable) acting as C-BSRs are set in each of the division IP multicast domain. After that, for the respective ones of the division IP multicast domains, data communication apparatuses SA1, SA2 and SA2, in a form of L3-SWs, routers or servers each having the BSR peer function built therein are separately set, and for each thereof, the highest priority is set in the relevant division IP multi-cast domain.

Then, among the respective division IP multicast domains DA, DB and DC, by means of the BSR pear function of the above-mentioned data communication apparatuses SA1, SA2 and SA2, C-RP information which each of these BSRs has is delivered and collected. Then, each of these BSRs delivers the C-RP information of the other division IP multicast domains collected by mean of the BSR peer function and C-RP information of the own division IP multicast domain, to other L3-SWs in the own division IP multicast domain.

Thus, what is different from the embodiment described above with reference to FIG. 10 is that, for the respective ones of the division IP multicast domains DA, DB and DC, the apparatuses SA1, SA2 and SA3 each of which always acts as a BSR are set. In this configuration, since it is not necessary that each of all the data communication apparatuses acting as C-BSRs has the above-mentioned BSR peer function, the costs and time required to build the system can be effectively reduced.

According to the embodiments of the present invention, an IP multicast domain applying the PIM-SM BSR method is operated in a form in which the IP multicast domain is divided to scopes same as those of IP unicast domains, and, as a result, it is possible to reduce spreading of influence of a possible trouble occurring in any BSR. Also, according to the embodiments of the present invention, it is possible to improve the efficiency in the network management and operation.

Further, the present invention is not limited to the above-described embodiments, and variations and modifications may be made without departing from the basic concept of the present invention claimed below.

The present application is based on Japanese priority application No. 2004-101103, filed on Mar. 30, 2004, the entire contents of which are hereby incorporated herein by reference.

What is claimed is:

1. A multicast data communication system comprising:
management routers each of which is assigned for a respective one of division multicast domains obtained from dividing an original multicast domain into predetermined divisions, wherein:
the management routers share information concerning locations of multicast information sources belonging to the division multicast domains for which the management routers are assigned, respectively, wherein:
each of the management routers is determined in such a manner that a data communication apparatus which has a highest priority in a respective one of the division multicast domains is determined as each of the management routers,
each of the management routers collects information concerning locations of multicast information sources belonging to its own division multicast domain from data communication apparatuses belonging to the same division multicast domain and delivers the information concerning locations of multicast information sources belonging to its own division multicast domain to the others of the management routers belonging to the original multicast domain,
each of the management routers receives from the others of the management routers belonging to the original multicast domain information concerning locations of multicast information sources belonging to respective ones of the division multicast domains of the others of the management routers, so as to obtain information concerning locations of multicast information sources belonging to the entirety of the original multicast domain, and
each of the management routers comprises a first table for managing the information concerning locations of multicast information sources belonging to its own division multicast domain, a second table for managing the information concerning locations of multicast information sources belonging to the respective ones of the division multicast domains of the others of the management routers, and a third table for managing information concerning whether each of the others of the management routers is on operation, as well as identification information and an address of each of the others of the management routers.

2. The multicast data communication system as claimed in claim 1, wherein:
the predetermined divisions comprise divisions corresponding to respective ones of unicast domains configuring the original multicast domain.

3. The multicast data communication system as claimed in claim 1, wherein:
the information concerning locations of the multicast information sources comprises information concerning locations of data communication apparatuses provided between particular multicast information sources and terminals which receive information from the multicast information sources, and acting as rendezvous points carrying out data transfer therebetween.

4. The multicast data communication system as claimed in claim 1, wherein:
each of the management routers periodically carries out communication thereamong to mutually share information concerning locations of the others of the management routers and information concerning locations of the multicast information sources belonging to respective ones of the division multicast domains belonging to the others of the management routers, respectively.

5. The multicast data communication system as claimed in claim 1, wherein:
the information shared by the management routers comprises information concerning states of the management routers.

6. The multicast data communication system as claimed in claim 5, wherein:
the information concerning the states of the management routers comprises information as to whether the management routers currently function as respective management routers normally.

7. The multicast data communication system as claimed in claim 1, wherein:
multicast communication carried out by the multicast data communication system is carried out according to a PIM-SM protocol.

8. The multicast data communication system as claimed in claim 7, wherein:
each of the management routers comprises a bootstrap router.

9. The multicast data communication system as claimed in claim 1, wherein:
multicast communication carried out by the multicast data communication system comprises communication using IP packets.

10. A data communication apparatus, assigned as each of management routers for a respective one of division multicast domains obtained from dividing an original multicast domain into predetermined divisions, the data communication apparatus comprising:

a processor; and a memory, wherein:

the data communication apparatus shares information concerning locations of multicast information sources belonging to a respective one of the division multicast domains for which the data communication apparatus is assigned, with data communication apparatuses respectively assigned as the others of the management routers, wherein:

the data communication apparatus is determined in such a manner that a data communication apparatus which has a highest priority in a respective one of the division multicast domains is determined as each of the management routers, the data communication apparatus collects information concerning locations of multicast information sources belonging to its own division multicast domain from data communication apparatuses belonging to the same division multicast domain and delivers the information concerning locations of multicast information sources belonging to its own division multicast domain to the others of the management routers belonging to the original multicast domain, the data communication apparatus receives from the others of the management routers belonging to the original multicast domain information concerning locations of multicast information sources belonging to respective ones of the division multicast domains of the others of the management routers, so as to obtain information concerning locations of multicast information sources belonging to the original multicast domain, and the memory comprises a first table for managing the information concerning locations of multicast information sources belonging to the division multicast domain of the data communication apparatus, a second table for managing the information concerning locations of multicast information sources belonging to respective ones of the division multicast domains of the others of the management routers, and a third table for managing information concerning whether each of the others of the management routers is on operation, as well as identification information and an address of each of the others of the management routers.

11. The data communication apparatus as claimed in claim 10, wherein:

the predetermined divisions comprise divisions corresponding to respective ones of unicast domains configuring the original multicast domain.

12. The data communication apparatus as claimed in claim 10, wherein:

the information concerning locations of the multicast information sources comprises information concerning locations of data communication apparatuses provided between particular multicast information sources and terminals which receive information from the multicast information sources, and acting as rendezvous points carrying out data transfer therebetween.

13. The data communication apparatus as claimed in claim 10, periodically carrying out communication with the others of the management routers to share information concerning locations of the others of the management routers and information concerning locations of the multicast information sources belonging to respective ones of the division multicast domains belonging to the others of the management routers.

14. The data communication apparatus as claimed in claim 10, wherein:

the information shared with the others of the management routers comprises information concerning states of respective ones of the others of the management routers.

15. The data communication apparatus as claimed in claim 14, wherein:

the information concerning the states of the respective ones of the others of the management routers comprises information as to whether data communication apparatuses assigned as the respective ones of the others of the management routers currently function as respective management routers normally.

16. The data communication apparatus as claimed in claim 10, wherein:

multicast communication carried out by the data communication apparatus is carried out according to a PIM-SM protocol.

17. The data communication apparatus as claimed in claim 16, comprising a bootstrap router.

18. The data communication apparatus as claimed in claim 10, wherein:

multicast communication carried out by the data communication apparatus comprises communication using IP packets.

19. A multicast data communication method comprising:

assigning each of management routers for a respective one of division multicast domains obtained from dividing an original multicast domain into predetermined divisions, and sharing, among the management routers, information concerning locations of multicast information sources belonging to the division multicast domains for which the management routers are assigned, respectively, wherein:

each of the management routers is determined in such a manner that a communication apparatus which has a highest priority in a respective one of the division multicast domains is determined as each of the management routers, each of the management routers collects information concerning locations of multicast information sources belonging to its own division multicast domain from data communication apparatuses belonging to the same division multicast domain and delivers the information concerning locations of multicast information sources belonging to its own division multicast domain to the others of the management routers belonging to the original multicast domain, each of the management routers receives from the others of the management routers belonging to the original multicast domain information concerning locations of multicast information sources belonging to respective ones of the division multicast domains of the others of the management routers, so as to obtain information concerning locations of multicast information sources belonging to the entirety of the original multicast domain, and each management router comprises a first table for managing the information concerning locations of multicast information sources belonging to its own division multicast domain, a second table for managing the information concerning locations of multicast information sources belonging to the respective ones of the division multicast domains of the others of the management routers, and a third table for managing information concerning whether each of the others of the management routers is on operation, as well as identification information and an address of each of the others of the management routers.

20. The multicast data communication method as claimed in claim 19, wherein:
the predetermined divisions comprise divisions corresponding to respective ones of unicast domains configuring the original multicast domain.

21. The multicast data communication method as claimed in claim 19, wherein:
the information concerning locations of the multicast information sources comprises information concerning locations of data communication apparatuses provided between particular multicast information sources and terminals which receive information from the multicast information sources, and acting as rendezvous points carrying out data transfer therebetween.

22. The multicast data communication method as claimed in claim 19, further comprising:
periodically carrying out communication among the management routers periodically to mutually share information concerning locations of the management routers and information concerning locations of the multicast information sources belonging to the division multicast domains belonging to the management routers, respectively.

23. The multicast data communication method as claimed in claim 19, wherein:
the information shared by the management routers comprises information concerning states of the management routers.

24. The multicast data communication method as claimed in claim 23, wherein:
the information concerning the states of the management routers comprises information as to whether the management routers currently functions as respective management routers normally.

25. The multicast data communication method as claimed in claim 19, wherein:
multicast communication applied to the multicast data communication method is one carried out according to a PIM-SM protocol.

26. The multicast data communication method as claimed in claim 25, wherein:
the management routers comprise bootstrap routers, respectively.

27. The multicast data communication method as claimed in claim 19, wherein:
multicast communication applied to the multicast data communication method comprises communication using IP packets.

28. A computer readable non-transitory information recording medium storing therein a program comprising instructions for causing a computer, which controls a data communication apparatus, to perform a process comprising:
sharing, among management routers, information concerning locations of multicast information sources belonging to division multicast domains for which the management routers are assigned, respectively, wherein:
the data communication apparatus is assigned as each of the management routers for a respective one of the division multicast domains obtained from dividing an original multicast domain into predetermined divisions, wherein:
each of the management routers is determined in such a manner that a communication apparatus which has a highest priority in a respective one of the division multicast domains is determined as each of the management routers,
each of the management routers collects information concerning locations of multicast information sources belonging to its own division multicast domain from data communication apparatuses belonging to the same division multicast domain and delivers the information concerning locations of multicast information sources belonging to its own division multicast domain to the others of the management routers belonging to the original multicast domain,
each of the management routers receives from the others of the management routers belonging to the original multicast domain information concerning locations of multicast information sources belonging to respective ones of the division multicast domains of the others of the management routers, so as to obtain information concerning locations of multicast information sources belonging to the entirety of the original multicast domain, and
each of the management routers comprises a first table for managing the information concerning locations of multicast information sources belonging to its own division multicast domain, a second table for managing the information concerning locations of multicast information sources belonging to the respective ones of the division multicast domains of the others of the management routers, and a third table for managing information concerning whether each of the others of the management routers is on operation, as well as identification information and an address of each of the others of the management routers.

29. The computer readable non-transitory information recording medium as claimed in claim 28, wherein:
the predetermined divisions comprise divisions corresponding to respective ones of unicast domains configuring the original multicast domain.

30. The computer readable non-transitory information recording medium as claimed in claim 28, wherein:
the information concerning locations of the multicast information sources comprises information concerning locations of data communication apparatuses provided between the particular multicast information sources and terminals which receive information from the multicast information sources, and acting as rendezvous points carrying out data transfer therebetween.

31. The computer readable non-transitory information recording medium as claimed in claim 28, the program comprising further instructions for causing the computer to perform the process further comprising:
periodically carrying out communication with the others of the management routers to share information concerning locations of the others of the management routers and information concerning locations of multicast information sources belonging to respective ones of the division multicast domains belonging to the others of the management routers, respectively.

32. The computer readable non-transitory information recording medium as claimed in claim 28, wherein:
the information shared with the others of the management routers comprises information concerning respective states of the others of the management routers.

33. The computer readable non-transitory information recording medium as claimed in claim 32, wherein:
the information concerning the respective states of the others of the management routers comprises information as to whether the others of the management routers currently function as respective management routers normally.

34. The computer readable non-transitory information recording medium as claimed in claim 28, wherein:
multicast communication carried out by the data communication apparatus is one carried out according to a PIM-SM protocol.

35. The computer readable non-transitory information recording medium as claimed in claim 34, wherein:
the management routers comprise bootstrap routers, respectively.

36. The computer readable non-transitory information recording medium as claimed in claim 28, wherein:
multicast communication carried out by the data communication apparatus comprises communication using IP packets.

* * * * *